United States Patent
Seifert et al.

(10) Patent No.: US 12,087,470 B2
(45) Date of Patent: Sep. 10, 2024

(54) DRY, SYNTACTIC FOAM AS AN ELECTRICALLY INSULATING MATERIAL

(71) Applicant: Maschinenfabrik Reinhausen GmbH, Regensburg (DE)

(72) Inventors: Jens Seifert, Wunsiedel (DE); Diego Machetti, Cologne (DE); Sven Schumann, Aachen (DE); Marvin Bendig, Zirndorf (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 99 days.

(21) Appl. No.: 17/762,744

(22) PCT Filed: Sep. 23, 2020

(86) PCT No.: PCT/EP2020/076462
§ 371 (c)(1),
(2) Date: Mar. 23, 2022

(87) PCT Pub. No.: WO2021/058500
PCT Pub. Date: Apr. 1, 2021

(65) Prior Publication Data
US 2022/0359105 A1    Nov. 10, 2022

(30) Foreign Application Priority Data
Sep. 26, 2019   (DE) ............... 10 2019 125 962.2

(51) Int. Cl.
*H01B 17/56*    (2006.01)
*C08J 9/232*    (2006.01)
(Continued)

(52) U.S. Cl.
CPC .............. *H01B 17/56* (2013.01); *C08J 9/232* (2013.01); *C08J 9/32* (2013.01); *H01B 19/00* (2013.01); *C08J 2203/22* (2013.01)

(58) Field of Classification Search
None
See application file for complete search history.

(56) References Cited

U.S. PATENT DOCUMENTS 3,567,541 A * 3/1971 Kaczerginski ......... H01B 13/30
                                                          156/171
4,108,928 A * 8/1978 Swan, Jr. .................. C08J 9/32
                                                          428/313.5
(Continued)

FOREIGN PATENT DOCUMENTS

CN    1217072 A * 5/1999 ............. G02B 6/442
DE    102004008751 A1    9/2005
(Continued)

OTHER PUBLICATIONS

Oliver Belz, "Mikrohohlkugelgefülltes Silikongel als Isolierstoff in der Hochspannungstechni," Feb. 2011, pp. 7-11, Kassel University Press, Kassel, Germany.

*Primary Examiner* — Krystal Robinson
(74) *Attorney, Agent, or Firm* — Leydig, Voit & Mayer, Ltd.

(57) ABSTRACT

An electrical insulation device includes an insulator body having a chamber and an electrically insulating material within the chamber. The electrically insulating material includes a dry syntactic foam.

13 Claims, 2 Drawing Sheets

(51) Int. Cl.
   *C08J 9/32*        (2006.01)
   *H01B 19/00*       (2006.01)

(56) References Cited

U.S. PATENT DOCUMENTS

| | | | |
|---|---|---|---|
| 5,278,194 A * | 1/1994 | Tickner | C08J 9/32 521/146 |
| 6,593,381 B2 | 7/2003 | Whinnery, Jr. | |
| 2009/0173515 A1 | 7/2009 | Sjoberg et al. | |
| 2011/0017340 A1 | 1/2011 | Mirossay et al. | |
| 2014/0091248 A1 | 4/2014 | Luther et al. | |

FOREIGN PATENT DOCUMENTS

| | | |
|---|---|---|
| DE | 102010006507 A1 | 8/2011 |
| EP | 1575061 A2 | 9/2005 |
| EP | 2203522 A1 | 7/2010 |
| EP | 2538416 B1 | 8/2017 |
| WO | WO 9918582 A1 | 4/1999 |
| WO | WO 2009037358 A1 | 3/2009 |
| WO | WO 2012019988 A1 | 2/2012 |
| WO | WO 2017012780 A1 | 1/2017 |

* cited by examiner

DRY, SYNTACTIC FOAM AS AN ELECTRICALLY INSULATING MATERIAL

CROSS REFERENCE TO RELATED APPLICATIONS

This application is a U.S. National Phase application under 35 U.S.C. § 371 of International Application No. PCT/EP2020/076462, filed on Sep. 23, 2020, and claims benefit to German Patent Application No. DE 10 2019 125 962.2, filed on Sep. 26, 2019. The International Application was published in German on Apr. 1, 2021 as WO 2021/058500 A1 under PCT Article 21(2).

FIELD

The present invention relates to dry, syntactic foam as an electrically insulating material.

BACKGROUND

Electrically insulating materials or dielectrics may in principle be divided into three groups, namely into gases, liquids and solids, according to their state of matter. These materials must especially meet the prerequisite that no electrical breakdown takes place under operating conditions, meaning that the electrical stress to which they are subjected is below their critical electrical breakdown resistance. While solid dielectrics have the highest electrical breakdown resistances, these also have the highest densities. This leads to high mechanical stresses and hence to elevated servicing costs. The same also applies in principle to liquid dielectrics, with the electrical breakdown resistance of liquids generally being lower than that of solids. If a low density is required, gases are typically used as electrically insulating materials, even though their electrical breakdown resistance is even lower. The use of liquids and gases has the additional drawback that these can run out or escape in the event of a leak. By contrast, this problem does not occur with solid dielectrics.

In high-voltage engineering, what are called air-insulated hollow core insulators are commonly used, for example in substations. Originally, essentially ceramic-based hollow core insulators were used here; there is now increasing use of composite hollow core insulators.

The cavities of these hollow core insulators are typically filled with nitrogen ($N_2$) or sulfur hexafluoride ($SF_6$) as electrically insulating material. But the use of these gaseous dielectrics entails a sophisticated monitoring system in order to detect any leaks in the hollow core insulator in operation. In addition, it must be ensured that the insulator is permanently gastight. Moreover, the fluorinated compound sulfur hexafluoride is considered to be one of the strongest greenhouse gases and is also of extreme environmental concern for that reason. However, the dielectric filling gas cannot simply be replaced by another electrically insulating material since, on account of the large dimensions of high-voltage insulators (with a length of up to 10 m), the use of a standard solid dielectric would lead to an extremely high total weight of the insulator, which would be impracticable for the customary uses.

In order to resolve this conflict, the use of dielectric foams has been proposed. The thesis *"Einsatz von elastischen syntaktischen Schäumen in der Hochspannungstechnik"* [Use of Elastic Syntactic Foams in High-Voltage Engineering] by M. Kessler, RWTH Aachen, 2010, describes syntactic foams consisting of a silicone matrix incorporating gas-filled hollow microbeads. These syntactic foams based on a silicone gel offer the advantage of lower densities (in the range from about 0.7 to 1 $g/cm^3$) compared to other solid matrix systems. EP 2 203 522 A1 describes an electrical insulation device comprising a chamber with an electrically insulating material, wherein the electrically insulating material comprises a silicone-based gel as matrix and hollow microbeads in the matrix. However, in these syntactic foams, on account of a high mixed viscosity, only filling levels for the hollow microbeads of up to 50% by volume can be attained, and so it was not possible to achieve even lower densities. Furthermore, the dielectric properties (especially dielectric strength) are in the same order of magnitude as those of the pure silicone gel.

SUMMARY

In an embodiment, the present disclosure provides an electrical insulation device that includes an insulator body having a chamber and an electrically insulating material within the chamber. The electrically insulating material includes a dry syntactic foam.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
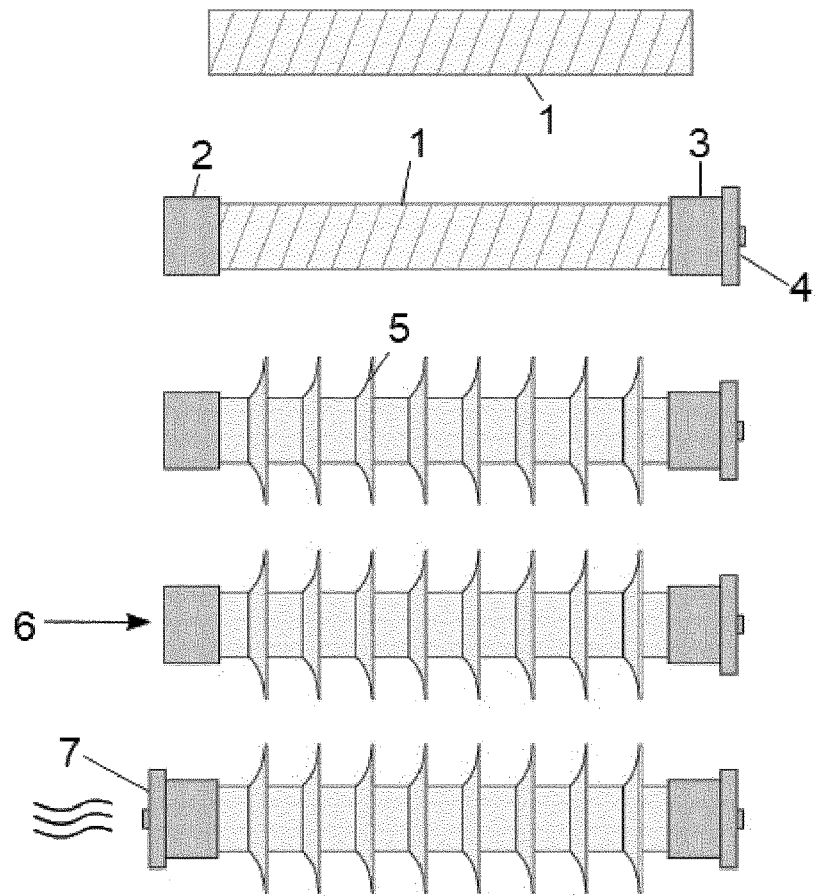
FIG. 1 shows a process for producing a composite insulator according to an embodiment of the invention.

The present disclosure is related to an insulation device having an insulator body having a chamber and an electrically insulating material within the chamber. The electrically insulating material includes a dry syntactic foam. The present disclosure further relates to the use of a dry syntactic foam as electrically insulating material and to a process for producing an electrical insulation device. The process may include: (a) the providing of an insulator body having a chamber, (b1)) either the providing of a mixture at least composed of polymer-based thermally expandable hollow microbeads in the expanded state and polymer-based thermally expandable hollow microbeads in the unexpanded state, (b2) or the providing of a mixture of at least two types of polymer-based thermally expandable hollow microbeads in the unexpanded state that have different temperature ranges for expansion, and (c) the foaming of the mixture of thermally expandable hollow microbeads by heat treatment at a temperature in the range from 50° C. to 200° C. to form a dry syntactic foam as electrically insulating material. The mixture of thermally expandable hollow microbeads may be either introduced into the chamber of the insulator body and foamed therein or the mixture of thermally expandable hollow microbeads may be first foamed and the resultant dry syntactic foam may be introduced into the chamber of the insulator body.

Embodiments of the present invention provide an electrical insulation device with an electrically insulating material that combines the advantages of solid dielectrics (namely the lack of risk of escape through a leak and good dielectric properties) with those of gaseous dielectrics (namely low weight).

Embodiments of the present invention provide an electrical insulation device comprising an insulator body having a chamber and an electrically insulating material within the chamber, wherein the electrically insulating material comprises a dry syntactic foam.

According to one or more aspects of the present invention, it has been found that, surprisingly, dry syntactic foams can be used as electrically insulating materials having high electrical breakdown resistance and simultaneously comparatively low density. Accordingly, the present disclosure relates to the use of dry syntactic foams as ultra-lightweight filler in hollow core insulators. Corresponding dry syntactic foams are known in the art; but their dielectric properties and hence their suitability as electrically insulating materials have now been found for the first time and in a surprising manner.

Embodiments of the present invention relate to an electrical insulation device. This may be in any suitable form and configuration. Preference is given in accordance with the invention to an insulation device for high-voltage applications. The insulation device may, for example, be a hollow core insulator (for example for applications in substations) or an insulator for high-voltage masts. Suitable hollow core insulators especially include composite insulators, porcelain insulators and hybrid insulators. In a preferred embodiment of the present invention, the electrical insulation device is in the form of a composite insulator or in the form of an arm of a high-voltage mast.

The electrical insulation apparatus of an embodiment of the invention comprises an insulator body having a chamber. The insulator body is thus a hollow body. This may consist of any material suitable as insulation device for the intended application. In a preferred embodiment of the present invention, the insulator body consists of a material selected from composite materials, porcelain and combinations thereof. The composite material is more preferably a glass fiber-reinforced plastic (GFRP). The insulator body may take any form suitable for the respective application. The insulator body preferably takes the form of a hollow tube or the form of a hollow rod. The tube or rod may have any suitable cross section. The insulator body may, for example, be a conical hollow tube of stepped diameter over its length, or a rotationally symmetric or rotationally asymmetric hollow tube. The insulator body may alternatively have a simple round cross section (i.e. be in the form of a cylinder) or else have a rectangular or square cross section.

In a preferred embodiment, the insulator body is a tube made of a composite material or of porcelain. More preferably, the insulator body is a tube made of a glass fiber-reinforced plastic. This tube may be produced in a suitable manner by methods known to the person skilled in the art, for example by dipping glass fibers into an appropriate resin and then winding them to form a hollow tube.

The electrical insulation device of the invention may, as well as the insulator body, may optionally comprise further components, for example flanges and/or metallic fittings, at the respective ends of the insulation device or insulator body. These flanges and fittings are preferably corrosion-resistant and may consist, for example, of steel, aluminum or an aluminum alloy. The flanges or fittings may optionally comprise ventilation openings that are optionally closable. Through these, air can escape during the process of expansion of the thermally expandable hollow microbeads if this expansion is conducted directly within the insulator body. The electrical insulation device of an embodiment of the invention may also comprise a housing or an envelope, for example made of plastic or silicone, in order to protect the electrical insulation device. Any gap between end fitting and the housing or envelope may optionally be sealed with a suitable sealant, in order to prevent the penetration of moisture to the insulator body, in order thus to assure a long lifetime of the electrical insulation device. Suitable sealants include, for example, stray current-resistant polyurethane. In a particularly preferred embodiment of the present invention, the electrical insulation device additionally comprises flanges at both ends of the insulator body, with at least one flange having a closable ventilation opening, and a silicone housing disposed around the insulator body.

The electrical insulation device of an embodiment of the invention may further include an electrically insulating material in the chamber of the insulator body. In other words, the insulator body may be filled with an electrically insulating material. This electrically insulating material may include a dry syntactic foam. The electrically insulating material may, as well as the dry syntactic foam, optionally comprise further electrically insulating materials, for example nitrogen ($N_2$) or sulfur hexafluoride ($SF_6$). In a preferred embodiment of the present invention, the electrically insulating material consists of the dry syntactic foam, meaning that no further electrically insulating materials are present aside from the dry syntactic foam. The chamber of the insulator body may have any suitable filling level. For example, at least 70% by volume of the chamber is filled with the electrically insulating material, preferably at least 90% by volume. In a particularly preferred embodiment of the present invention, the chamber of the insulator body is filled essentially completely with the dry syntactic foam, i.e. the filling level of the chamber is at least 95% by volume.

In the context of the present invention, a dry syntactic foam (DSF) is understood to mean a material consisting of polymer-based thermally expandable hollow microbeads that have been at least partly expanded by heating. The thermally expandable hollow microbeads comprise a polymer shell and, at least prior to expansion, enclose a gas having a low boiling point. The gas is preferably an alkane gas, for example isopentane or isobutene. The syntactic foam used in accordance with the invention, by contrast with conventional syntactic foams, does not contain any liquid polymer matrix in which the hollow microbeads are embedded, and for that reason is referred to as dry syntactic foam. Corresponding dry syntactic foams and the production thereof are known in the art, for example from U.S. Pat. No. 6,593,381 B2.

The dry syntactic foam is obtainable by first providing a mixture of polymer-based thermally expandable hollow microbeads that have already been expanded and polymer-based thermally expandable hollow microbeads that are yet to be expanded. In the context of the present invention, the expression "thermally expandable hollow microbeads" thus includes already expanded hollow microbeads and as yet unexpanded hollow microbeads.

This mixture is then heated to a temperature in the range from 50° C. to 200° C., preferably in the range from 100° C. to 180° C., even more preferably in the range from 125° C. to 175° C. This increases the gas pressure in the as yet unexpanded hollow microbeads, and the polymer shell of the hollow microbeads is plastically deformed as soon as the corresponding glass transition temperature has been attained. This results in a significant increase in the sphere volume, i.e. foaming of the material. In a preferred embodiment of the present invention, the dry syntactic foam is thus obtainable by foaming a mixture at least of polymer-based thermally expandable hollow microbeads in the expanded state and polymer-based thermally expandable hollow microbeads in the unexpanded state.

This forms a matrix of the already expanded hollow microbeads, into which the as yet unexpanded hollow microbeads are embedded. In this way, the heat treatment (i.e. the foaming) can achieve homogeneous expansion of the as yet unexpanded hollow microbeads, which leads to a foam having uniform material distribution and an ordered pore structure. More particularly, it is possible in this way to exactly adjust the pore sizes of the foam, and for that reason the foam is referred to as syntactic foam.

In an alternative preferred embodiment, the dry syntactic foam is also obtainable by foaming a mixture of at least two types of polymer-based thermally expandable hollow microbeads in the unexpanded state, wherein the at least two types of thermally expandable hollow microbeads have different temperature ranges for expansion. In this case, what is thus used is not a mixture of already expanded and as yet unexpanded hollow microbeads, but rather at least two different types of hollow microbeads. For example, a first type of hollow microbeads may be expandable within a temperature range from 50° C. to 120° C., while a second type of hollow microbeads is expandable at a higher temperature of more than 120° C. If a mixture of these two types of hollow microbeads is first heated to a temperature in the range from 50° C. to 120° C., preferably in the range from 80° C. to 100° C., only the first type of hollow microbeads is expanded at first, and this then serves as matrix for the second type of hollow microbeads. This second type of hollow microbeads is then expanded in a second step by a heat treatment at a temperature of more than 120° C., preferably at a temperature in the range from 130° C. to 160° C.

But it is also possible to use more than two types of hollow microbeads. It is also possible to combine the two aforementioned methods. For example, a mixture of two types of already expanded hollow microbeads may be used together with two types of as yet unexpanded hollow microbeads.

By suitable choice of the type and mixing ratio of the hollow microbeads, it is possible to adjust the properties of the dry syntactic foam in a suitable manner.

Suitable dry syntactic foams and hollow microbeads for the production thereof are known in the art and commercially available. In this connection, reference is made by way of example to hollow microbeads that are sold by Nouryon under the Expancel® trade name. These are available both in expanded form (Expancel® DE ("dry, expanded")) and in unexpanded form (Expancel® DU ("dry, unexpanded")), in various sizes and densities. Suitable unexpanded hollow microbeads are, for example, those with the designations 031 DU 40 (bulk density 0.4134 g/cm$^3$), 551 DU 40 (bulk density 0.5543 g/cm$^3$), 920 DE 40 (bulk density 0.4633 g/cm$^3$), 920 DE 80 (bulk density 0.4937 g/cm$^3$) and 461 DU 40 (bulk density 0.4553 g/cm$^3$), where bulk density in the context of the present invention is defined as the mass of the powder material of the hollow microbeads that fills a particular volume. Suitable expanded hollow microbeads are, for example, 551 DET 40 d25 (bulk density 0.0125 g/cm$^3$) and 920 DET 40 d25 (bulk density 0.0146 g/cm$^3$). The unexpanded hollow microbeads thus have about 50 times the bulk density of the expanded hollow microbeads.

The density of the electrically insulating material may be adjusted in a suitable manner by choice of suitable thermally expandable hollow microbeads. In a preferred embodiment of the present invention, the electrically insulating material has a density of 0.01 g/cm$^3$ to 0.6 g/cm$^3$, especially preferably of 0.05 g/cm$^3$ to 0.5 g/cm$^3$, more preferably in the range of 0.1 to 0.2 g/cm$^3$. These densities can be achieved without simultaneously significantly impairing the electrical properties of the electrically insulating material.

The electrical breakdown resistance (also referred to as dielectric strength) of the electrical insulating material can likewise be adjusted in a suitable manner by choice of appropriate thermally expandable hollow microbeads. In a preferred embodiment of the present invention, this is 5 kV/mm to 60 kV/mm, more preferably 10 kV/mm to 50 kV/mm and most preferably 30 kV/mm to 40 kV/mm (measured by standard IEC 60243-1 "Electric strength of insulating materials", 2014, with electrodes embedded into the material).

The electrically insulating material preferably has a minimum water absorption capacity since the dry syntactic foam could otherwise absorb too much water in use, which would lead to an increase in weight of the electrical insulation device and to a reduction in electrical breakdown resistance. In a preferred embodiment of the present invention, the dry syntactic foam has a water absorption capacity of not more than 4% by volume, measured by immersing a sample of the foam into distilled water for 2 weeks at 50° C., more preferably of not more than 1% by volume. Furthermore, it is possible to take further measures in order to avoid absorption of water by the dry syntactic foam in use, especially suitable sealing of the insulator body.

In a preferred embodiment of the present invention, the thermally expandable hollow microbeads and the material of the insulator body are chosen such that they are temperature-compatible. This should be noted particularly when the insulator body comprises a composite material. In this case, it is preferable that the glass transition temperature ($T_g$) of the polymer from which the shell of the hollow microbeads is formed is at least 20° C., preferably at least 30° C., below the glass transition temperature of the polymer of the composite material. Consequently, for an insulator body made of glass fiber-reinforced plastic having a glass transition temperature of 130° C., preference is given especially to polymer-based hollow microbeads having a glass transition temperature of less than 110° C., for example Nouryon Expancel® 461 DU 40 ($T_g$ 100° C.), Nouryon Expancel® 031 DU 40 ($T_g$ 95° C.) or Nouryon Expancel® 551 DU 40 ($T_g$ 100° C.).

In a very particularly preferred embodiment, the present invention relates to a composite insulator comprising:
  a hollow tube of glass fiber-reinforced plastic,
  a dry syntactic foam as electrically insulating material as filling in the hollow tube,
  flanges at the two ends of the hollow tube, with at least one flange having a closable ventilation opening, and
  a silicone housing disposed around the hollow tube.

It is possible in accordance with the invention to replace conventional gaseous electrically insulating materials in electrical insulation devices with dry syntactic foams, which likewise have a low density and hence enable the production of electrical insulation devices having low weight, and which simultaneously avoid the disadvantages of gaseous electrically insulating materials. It has also been found that, surprisingly, the dry syntactic foams used as electrically insulating material in accordance with the invention have good adhesion to the material of the insulator body, such that no additional adhesive is required. Adhesion is good especially when the insulator body consists of a composite material (especially of glass fiber-reinforced plastic). Adhesion is likewise good with respect to aluminum and other metals that may be used, for example, as materials for the fittings and/or flanges at the respective ends of the insulator body or of the electrical insulation device. The dry syntactic foams used in accordance with the invention as electrically insulating material additionally have the further advantages that they have good and easy producibility and processing, are nontoxic, and from an environmental point of view are of lower concern than conventionally used sulfur hexafluoride.

Preference is given in accordance with the invention to an insulation device for high-voltage applications. The insulation device may, for example, be a hollow core insulator (for example for applications in substations) or an insulator for high-voltage masts. Suitable hollow core insulators especially include composite insulators, porcelain insulators and hybrid insulators. In a preferred embodiment of the present invention, the electrical insulation device is in the form of a composite insulator.

In a further preferred embodiment of the present invention, the electrical insulation device is in the form of an arm of a high-voltage mast. This application has the advantage that, firstly, it is possible to achieve a weight saving in the arms of high-voltage masts. Secondly, the power cables, on account of the dielectric properties of the dry syntactic foam in the insulator body, can be secured on the arm of the high-voltage mast directly or via metallic fittings. In this way, it is possible to dispense with any additional insulation, which enormously simplifies the construction of the power mast.

The present invention further relates to the use of a dry syntactic foam as electrically insulating material. Preference is given here to using the dry syntactic foam as filling in a hollow body made of composite material or made of porcelain. The hollow body preferably takes the form of a tube. A preferred composite material is a glass fiber-reinforced plastic.

In a preferred embodiment, the dry syntactic foam is used as electrically insulating material high-voltage applications, for example as composite insulator or as an arm of a high-voltage mast.

The present invention further relates to a process for producing an electrical insulation device, comprising the following steps:
(a) the providing of an insulator body having a chamber,
(b1) either the providing of a mixture at least composed of polymer-based thermally expandable hollow microbeads in the expanded state and polymer-based thermally expandable hollow microbeads in the unexpanded state,
(b2) or the providing of a mixture of at least two types of polymer-based thermally expandable hollow microbeads in the unexpanded state that have different temperature ranges for expansion, and
(c) the foaming of the mixture of thermally expandable hollow microbeads by heat treatment at a temperature in the range from 50° C. to 200° C. to form a dry syntactic foam as electrically insulating material,
wherein the mixture of thermally expandable hollow microbeads is either introduced into the chamber of the insulator body and foamed therein or the mixture of thermally expandable hollow microbeads is first foamed and the resultant dry syntactic foam is introduced into the chamber of the insulator body.

In step (a) of the process of an embodiment of the invention, an insulator body having a chamber is first provided. The insulator body is thus a hollow body. This insulator body may be any suitable insulator body, as already described above.

In step (b) of the process of an embodiment of the invention, a mixture of polymer-based thermally expandable hollow microbeads is provided.

For this purpose, in a first alternative (b1), a mixture at least of polymer-based thermally expandable hollow microbeads in the expanded state and polymer-based thermally expandable hollow microbeads in the unexpanded state may be provided. As already described above, such thermally expandable hollow microbeads are known in the art and are commercially available. In this connection, reference is made by way of example to hollow microbeads that are sold by Nouryon under the Expancel® trade name. These are available both in expanded form (Expancel® DE ("dry, expanded")) and in unexpanded form (Expancel® DU ("dry, unexpanded")), in various sizes and densities. Suitable unexpanded hollow microbeads are, for example, those with the designations 031 DU 40 (bulk density 0.4134 g/cm$^3$), 551 DU 40 (bulk density 0.5543 g/cm$^3$), 920 DE 40 (bulk density 0.4633 g/cm$^3$), 920 DE 80 (bulk density 0.4937 g/cm$^3$) and 461 DU 40 (bulk density 0.4553 g/cm$^3$), where bulk density in the context of the present invention is defined as the mass of the powder material of the hollow microbeads that fills a particular volume. Suitable expanded hollow microbeads are, for example, 551 DET 40 d25 (bulk density 0.0125 g/cm$^3$) and 920 DET 40 d25 (bulk density 0.0146 g/cm$^3$). The unexpanded hollow microbeads thus have about 50 times the bulk density of the expanded hollow microbeads.

Taking account of the measured bulk densities, the mass contribution of the expanded or unexpanded hollow microbeads (i.e. the ratio of the masses of the two types of hollow microbeads) can then be calculated depending on the target density of the dry syntactic foam.

The mixture is produced preferably by charging a suitable vessel with the expanded hollow microbeads and then adding the unexpanded hollow microbeads. In this way, the unexpanded hollow microbeads are embedded directly into the already expanded hollow microbeads. The hollow microbeads can then be mixed with one another in order to achieve homogeneous distribution of the two types of hollow microbeads. This mixing can be conducted in a suitable mixing apparatus for a suitable period of, for example, 1 to 20 minutes, preferably in the range from 10 to 15. In a preferred embodiment, the mixing can be conducted directly in the vessel in which the foaming is effected in step (c), i.e., for example, directly in the chamber of the insulator body or in a separate expansion mold.

In a second alternative (b2), a mixture of at least two types of polymer-based thermally expandable hollow microbeads in the unexpanded state that have different temperature ranges for expansion is provided.

In step (b), it is of course also possible to use more than two types of hollow microbeads. It is also possible to combine the two aforementioned alternatives (b1) and (b2). For example, a mixture of two types of already expanded hollow microbeads may be used together with two types of as yet unexpanded hollow microbeads.

In step (c) of the process of the invention, the mixture of thermally expandable hollow microbeads is then foamed by heat treatment at a temperature in the range from 50° C. to 200° C. to form a dry syntactic foam as electrically insulating material.

For this purpose, the mixture of thermally expandable hollow microbeads is either introduced into the chamber of the insulator body and foamed therein or the mixture of thermally expandable hollow microbeads is first foamed and the resultant dry syntactic foam is introduced into the chamber of the insulator body.

If the mixture of thermally expandable hollow microbeads is first foamed outside the chamber, this can be effected, for example, in a suitable expansion mold. This preferably has the same shape as the chamber of the insulator body into which the dry syntactic foam is then introduced. This has the advantage that the shape of the dry syntactic foam does not need to be additionally adjusted before introduction into the insulator body, for example by cutting it to size. The expansion mold preferably contains a nonstick coating, for example of PTFE, in order to prevent the foam from sticking to the expansion mold and being removable therefrom only with difficulty.

In a preferred embodiment, the mixture of thermally expandable hollow microbeads is introduced into the chamber and foamed therein. This direct introduction of the mixture into the chamber of the insulator body is advantageous because, in this manner, one process step less is required, namely the transfer of the dry syntactic foam from the expansion mold into the insulator body. Moreover, when the mixture of thermally expandable hollow microbeads is foamed in the chamber, it is possible to achieve better adhesion of the foam to the walls of the chamber of the insulator body.

The heating is effected, for example, in a suitable oven. The foaming is effected at a temperature in the range from 50° C. to 200° C. In a preferred embodiment, the foaming is conducted at a temperature in the range from 100° C. to 180° C., preferably at a temperature in the range from 125° C. to 175° C.

The expansion or foaming temperature should preferably be selected depending on the glass transition temperature of the polymer of which the shell of the hollow microbeads consists ($T_{min}$) and on the temperature at which the hollow microbeads attain their maximum expansion volume ($T_{max}$). The expansion or foaming temperature is preferably between $T_{min}$ and $T_{max}$, more preferably about $(T_{min}+T_{max})/2$.

The foaming can be effected at a constant temperature. It is alternatively possible to increase the temperature continuously or stepwise during foaming until the aforementioned temperature ranges are attained. If, for example, in alternative (b2), a mixture of at least two types of polymer-based thermally expandable hollow microbeads in the unexpanded state that have different temperature ranges for expansion is used, it is possible, for example, for a first type of hollow microbeads to be expandable within a temperature range from 50° C. to 120° C., while a second type of hollow microbeads is expandable at a higher temperature of more than 120° C. If a mixture of these two types of hollow microbeads is first heated to a temperature in the range from 50° C. to 120° C., preferably in the range from 80° C. to 100° C., only the first type of hollow microbeads is expanded at first, and this then serves as matrix for the second type of hollow microbeads. This second type of hollow microbeads is then expanded in a second step by a heat treatment at a temperature of more than 120° C., preferably at a temperature in the range from 130° C. to 160° C.

The duration of the foaming or heat treatment can be chosen in a suitable manner by the person skilled in the art. For example, the heat treatment can be effected for a period in the range from 15 minutes to 4 hours, preferably for a period in the range from 1 to 3 hours.

Through the choice of temperature and the duration for the heat treatment for foaming of the thermally expandable hollow microbeads, it is possible to adjust the ultimate size of the hollow microbeads and hence the density of the dry syntactic foam.

In a preferred embodiment, step (c) is divided into a first component step (c1) and a second component step (c2). In step (c1), the mixture of thermally expandable hollow microbeads formed according to alternative (b1) and/or alternative (b2) is foamed in a first expansion stage by a heat treatment at a temperature in the range from 50° C. to 200° C. for a fixed duration to form a pre-expanded mixture of thermally expandable hollow microbeads. This first expansion stage does not expand the mixture of thermally expandable hollow microbeads completely, i.e. not as yet to the desired density of the dry syntactic foam, but rather only until a desired "pre-expanded" state of the hollow microbeads has been attained. This has preferably been attained at a density of the mixture in the range from 0.01 g/cm$^3$ to 0.9 g/cm$^3$.

Through the choice of temperature and the duration for the heat treatment of the first expansion stage, it is possible to adjust the state of the hollow microbeads. The heat treatment in the first expansion stage can preferably be effected in a suitable oven at a temperature in the range from 100° C. 175° C. for a period in the range from 15 minutes to 2 hours.

The mixture of thermally expandable hollow microbeads in component step (c1) is foamed in at least one suitable expansion mold having at least a smaller volume than the chamber of the insulator body, in such a way that individual structure components consisting of the mixture of hollow microbeads are formed in the pre-expanded state. The structure components may take the form, for example, of disks of thickness within a range from 2 cm to 50 cm and of diameter less than or equal to the diameter of the chamber of the insulator body.

In step (c2), the pre-expanded mixture of thermally expandable hollow microbeads is foamed in a second expansion stage by another heat treatment at a temperature in the range from 50° C. to 200° C. for a fixed duration to form a dry syntactic foam as electrically insulating material. For this purpose, the individual structure components are introduced into the chamber of the insulator body or into a suitable expansion mold. Preferably, the dry syntactic foam after the second expansion stage has a density of 0.01 g/cm$^3$ to 0.6 g/cm$^3$, preferably of 0.05 g/cm$^3$ to 0.5 g/cm$^3$. Through the choice of heat treatment and the duration for the heat treatment of the second expansion stage, it is possible to adjust the state of the hollow microbeads.

Preferably, the heat treatment of the second expansion stage can in turn be effected in a suitable oven at a desired temperature, preferably 100° C. to 175° C. Alternatively or additionally, hot air may be used in the second expansion step, which is introduced into the chamber of the insulation body or into the expansion mold and flows through the structure components. For this purpose, the structure components preferably have holes such that the air is able to circulate through better. The duration of the heat treatment in the second expansion stage is preferably in the range from 15 minutes to 5 hours.

The division of the foaming of the mixture into two expansion stages offers the advantage that, firstly, the density of the dry syntactic foam can be better adjusted and, secondly, particularly homogeneous material distribution of the electrically insulating material can be achieved.

In addition, it is possible in this way to fill even cavities having relatively large volumes by foaming without difficulty. This is because, in the case of large accumulations of the hollow microbeads, it may be the case that the heat does not arrive in the core, i.e. in the innermost region of the cavity volume, and therefore the hollow microbeads in these regions of the cavity do not expand completely, if at all. This is counteracted by the expansion in two stages and by the foaming in individual structure components.

In a preferred embodiment, the process of the invention comprises, after step (c) of foaming, another step (d) of vacuum treatment. This vacuum treatment is advantageous in order to remove remaining air, in order thus to enable further foaming of the hollow microbeads or to complete the foaming. Vacuum in the context of the present invention refers to any pressure of less than 200 mbar. The pressure in the vacuum treatment is preferably less than 100 mbar, even more preferably less than 20 mbar. The duration of vacuum treatment may, for example, be 1 minute to 1 hour, preferably 10 to 30 minutes. The vacuum treatment is preferably conducted at elevated temperature in order to enable further expansion of the hollow microbeads. The vacuum treatment is preferably conducted within the same temperature range as defined above for the foaming in step (c), where the temperatures in steps (c) and (d) may be the same or different. More preferably, the vacuum treatment is conducted at a temperature of not higher than $(T_{min}+T_{max})/2$, where $T_{min}$ states the glass transition temperature of the polymer and $T_{max}$ the temperature at which the hollow microbeads reach their maximum expansion volume.

In a preferred embodiment of the process of the invention, no adhesive is used for bonding of the electrically insulating material to the insulator body. It is possible to dispense with an adhesive especially when the foaming of the mixture of thermally expandable hollow microbeads is effected directly in the chamber of the insulator body.

The process of the invention is elucidated in detail hereinafter with reference to FIG. 1, without being limited thereto. A composite insulator of the invention may be produced, for example, by the process steps shown in FIG. 1. In a first step, a tube made of glass fiber-reinforced plastic 1 is provided. In a second step, the two ends of the tube 1 are provided with an open flange 2 or with a flange 3 having a cover having a ventilation opening 4. This can be effected by customary methods known in the art, for example adhesive bonding. The at least one ventilation opening serves to allow gas or air to escape during the expansion step. In the next step, a silicone housing 5 is mounted around the tube 1. The silicone housing may likewise be produced by customary methods known to those skilled in the art, for example by forming or by extrusion. Thereafter, the mixture of thermally expandable hollow microbeads 6 is introduced into tube 1 through the open flange 2. For this purpose, first of all, the proportions by mass for the at least two types of thermally expandable hollow microbeads are determined separately and weighed out. Then the at least two types of thermally expandable hollow microbeads are mixed with one another and introduced into the insulator body. In the last step, the flange 2 is then also provided with a cover 7 that may optionally also have a ventilation opening 7, and the mixture of thermally expandable hollow microbeads 6 is expanded by a heat treatment of the entire apparatus to form the dry syntactic foam in tube 1. This heat treatment is preferably effected in an oven. It is preferable that the insulator body is filled with the thermally expandable hollow microbeads only after the production of the tube made of glass fiber-reinforced plastic and of the silicone housing, since the temperatures required for the vulcanization of the silicone rubber could otherwise damage or destroy the hollow microbeads.

The invention is now elucidated in detail by examples.

EXAMPLES

Example 1

This example relates to the production of a dry syntactic foam in an expansion mold.

A mixture of expanded hollow microbeads of the Expancel® 551 DET 40 d25 type (34.7% by volume; bulk density 0.0125 g/cm$^3$) and unexpanded hollow microbeads of the Expancel® 551 DU 40 type (65.4% by volume; bulk density 0.5543 g/cm$^3$) with a bulk density of 0.2 g/cm$^3$ was expanded at a temperature of 120° C. in a cylindrical expansion mold made of aluminum with an inner PTFE coating for a period of 2 hours.

Also disposed in the expansion mold were two spherical electrodes each having a diameter of 12 mm at a separation of 1 mm. In order to ensure that this separation of 1 mm was observed even after performance of the expansion, the electrodes were fixed in position by means of suitable spacers.

Figure 2:
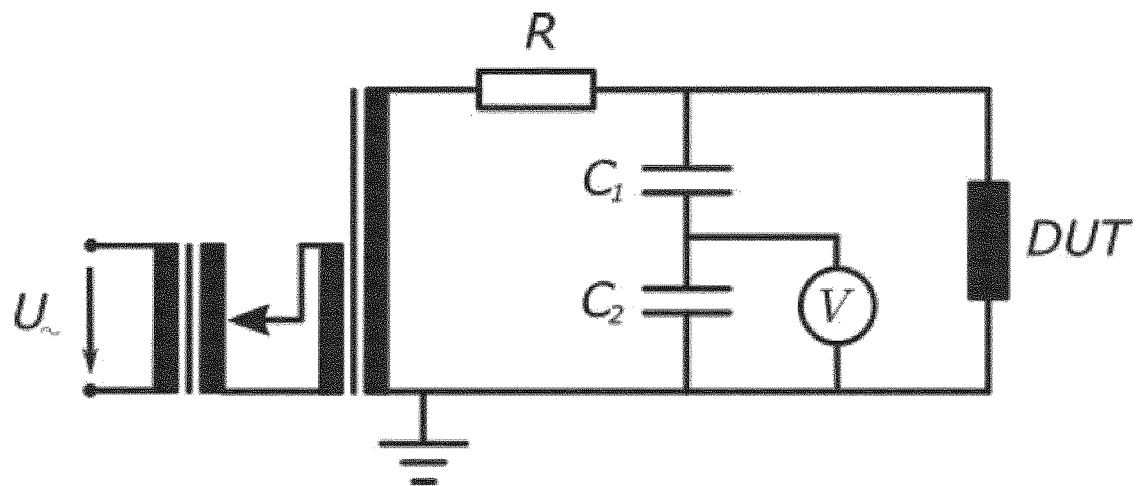
FIG. 2 shows a circuit for breakdown voltage measurements for determination of the electrical breakdown resistance.

After the expansion to form the dry syntactic foam in the expansion mold, the electrical breakdown resistance was determined using a circuit for measurements of breakdown voltage according to FIG. 2. The input voltage was controlled by means of a step transformer. A 320 kΩ resistor was connected in series with the sample in order to limit the short-circuit current. The voltage was measured with a capacitative voltage divider.

Five samples were subjected to a ramp voltage of 1 kV/mm. Breakdown voltages were detected with an oscilloscope, from which the peak field strengths were calculated by the following formula, where $\hat{U}_{BD}$ is the peak breakdown voltage, η the Schwaiger factor of the electrode arrangement, and g the gap separation between the two electrodes:

$$\hat{E}_{BD} = \frac{\hat{U}_{BD}}{\eta \cdot g}$$

The measurements, for the dry syntactic foam, gave an electrical breakdown resistance of 30.5 kV/mm with a standard deviation of σ=23%.

Example 2

This example relates to the production of a dry syntactic foam directly in an insulator body.

A mixture of expanded hollow microbeads of the Expancel® 551 DET 40 d25 type (83.9% by volume; bulk density 0.0125 g/cm$^3$) and unexpanded hollow microbeads of the Expancel® 551 DU 40 type (16.1% by volume; bulk density 0.5543 g/cm$^3$) with a bulk density of 0.1 g/cm$^3$ was expanded at a temperature of 120° C. directly in a cylindrical or annular insulator body made of glass fiber-reinforced polymer with an internal diameter of 120 mm and a height of 20 mm for a period of 2 hours. The cylinder was closed with a PTFE sheet at each end during the expansion.

Figure 3:
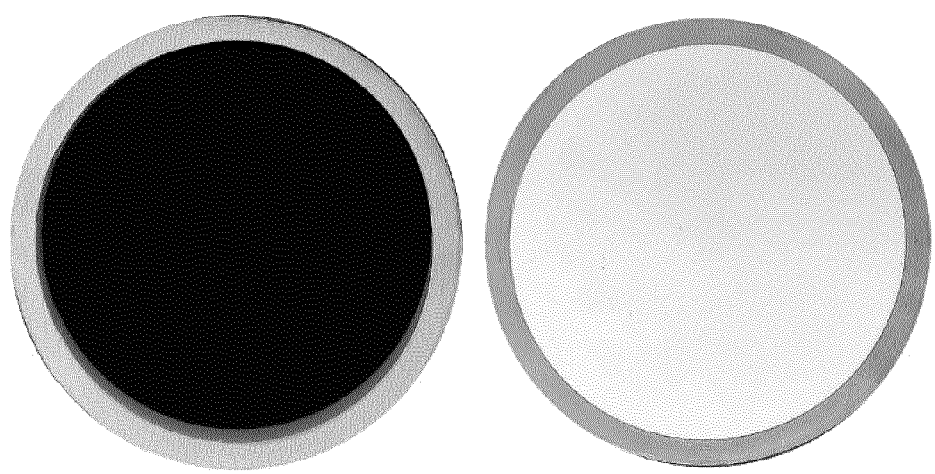
FIG. 3 shows a photographic image (top view) of an unfilled glass fiber-reinforced plastic ring and of one filled with a dry syntactic foam.

FIG. 3 shows, on the left-hand side, a photographic image of the unfilled insulator body and, on the right-hand side, a photographic image of the insulator body filled with the dry syntactic foam.

After the foaming, the cylindrical insulator body did not have any deformation at all. This shows that the expansion pressure is below the critical value that could cause plastic or mechanical deformation of the insulator body. Accordingly, the foaming can be conducted without difficulty directly within the insulator body.

It can also be inferred from FIG. 3 that the foam was homogeneous and essentially free of cavities. This shows that the foaming is homogeneous and leads to a uniform material distribution.

Finally, it was also found that the dry syntactic foam obtained after the foaming had strong binding to the glass fiber-reinforced polymer of the annular cylindrical insulator body. This shows that, in the case of foaming directly within the insulator body, no additional adhesive is required for bonding of the electrically conductive material to the insulator body.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 tube made of glass fiber-reinforced plastic
2, 3 flange
4, 7 flange cover with ventilation opening
5 silicone housing
6 mixture of thermally expandable hollow microbeads

The invention claimed is:

1. An electrical insulation device, the electrical insulation device comprising an insulator body comprising a chamber and an electrically insulating material within the chamber, wherein the electrically insulating material comprises a dry syntactic foam, wherein the dry syntactic foam is obtainable by foaming a mixture at least of polymer-based thermally expandable hollow microbeads in the expanded state and polymer-based thermally expandable hollow microbeads in the unexpanded state.

2. The electrical insulation device as claimed in claim 1, wherein the insulator body consists of a material selected from composite materials, porcelain, and combinations thereof.

3. The electrical insulation device as claimed in claim 1, wherein the insulator body is a tube made of a composite material or of porcelain.

4. The electrical insulation device as claimed in claim 1, wherein the chamber of the insulator body is filled essentially completely with the dry syntactic foam.

5. The electrical insulation device as claimed in claim 1 wherein the dry syntactic foam is obtainable by foaming a mixture of at least two types of polymer-based thermally expandable hollow microbeads in the unexpanded state, wherein the at least two types of thermally expandable hollow microbeads have different temperature ranges for expansion.

6. The electrical insulation device as claimed in claim 1 in the form of a composite insulator or in the form of an arm of a high-voltage mast.

7. The electrical insulation device as claimed in claim 1 wherein the electrically insulating material has a density of 0.01 $g/cm^3$ to 0.6 $g/cm^3$.

8. A composite insulator or an arm of a high-voltage mast comprising the electrical insulating device of claim 1.

9. The electrical insulation device as claimed in claim 1, wherein the dry syntactic foam does not contain any liquid polymer matrix.

10. A process for producing an electrical insulation device, the process comprising:
   (a) providing an insulator body having a chamber, either:
      (b1) providing a mixture at least comprised of polymer-based thermally expandable hollow microbeads in an expanded state and polymer-based thermally expandable hollow microbeads in the unexpanded state, or
      (b2) providing a mixture of at least two types of polymer-based thermally expandable hollow microbeads in an unexpanded state that have different temperature ranges for expansion, and
   (c) foaming of the mixture of thermally expandable hollow microbeads by heat treatment at a temperature in the range from 50° C. to 200° ° C. to form a dry syntactic foam as electrically insulating material,
   wherein the mixture of thermally expandable hollow microbeads is either introduced into the chamber of the insulator body and foamed therein or the mixture of thermally expandable hollow microbeads is first foamed and the resultant dry syntactic foam is introduced into the chamber of the insulator body.

11. The process as claimed in claim 10, wherein the step (c) comprises the following component steps (c1) and (c2):
   (c1) foaming the mixture of thermally expandable hollow microbeads by heat treatment at a temperature in the range from 50° C. to 200° C. for a fixed duration to form a pre-expanded mixture of thermally expandable hollow microbeads, and
   (c2) foaming the pre-expanded mixture of thermally expandable hollow microbeads by another heat treatment for a fixed duration to form a dry syntactic foam as electrically insulating material, wherein the mixture of thermally expandable hollow microbeads in the component step (c1) is foamed in at least one suitable expansion mold having at least a smaller volume than the chamber of the insulator body to form individual structure components, and, in the component step (c2), the individual structure components are introduced into the chamber of the insulator body or into a suitable expansion mold for another heat treatment.

12. The process as claimed in claim 10, wherein no adhesive is used for bonding of the electrically insulating material to the insulator body.

13. The process as claimed in claim 10, wherein the foaming is conducted at a temperature in the range from 100° C. to 180° C.

* * * * *